March 24, 1936. J. R. SENSIBAR 2,035,199
MEANS FOR HANDLING SAND
Filed April 1, 1932 11 Sheets-Sheet 1
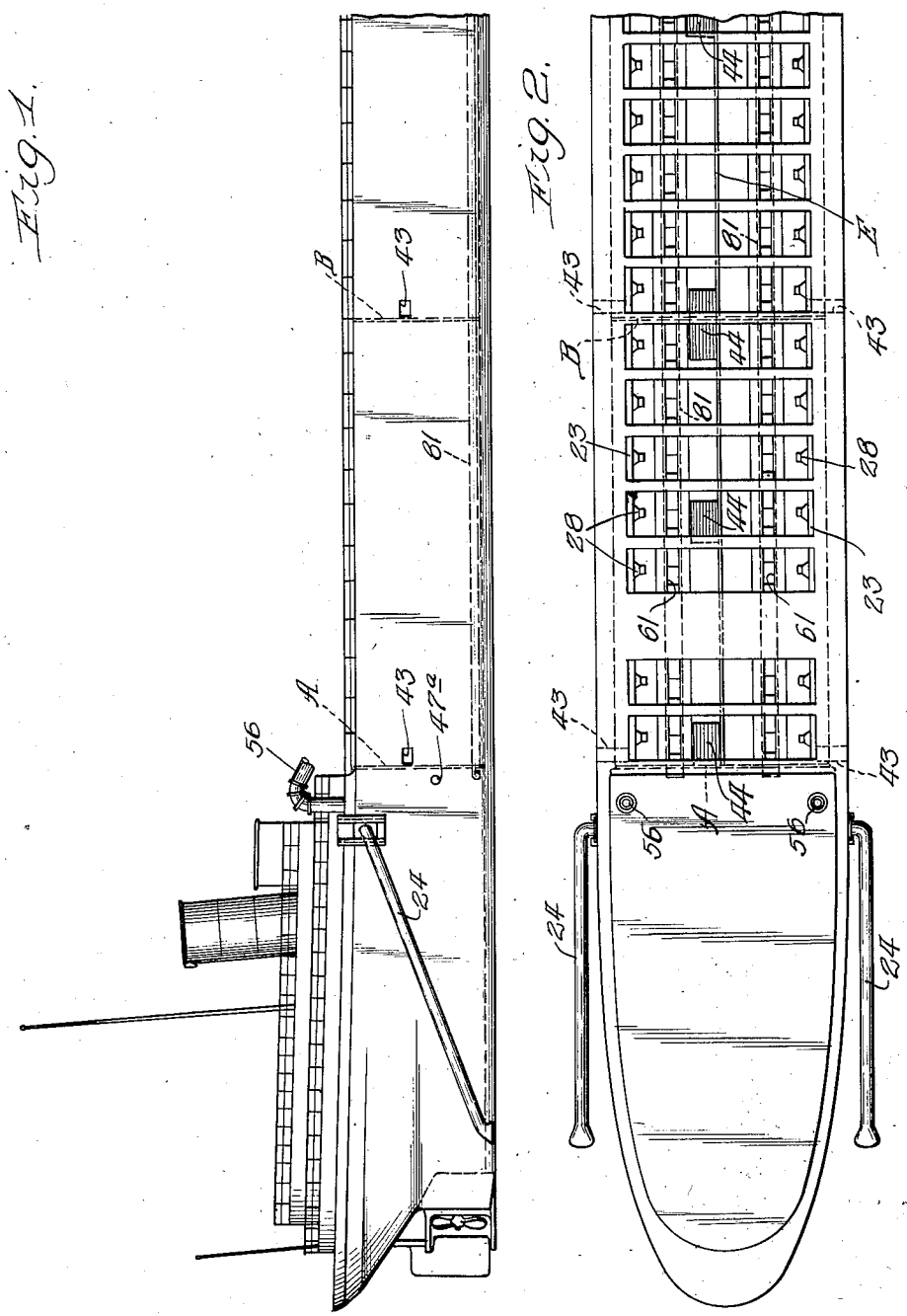

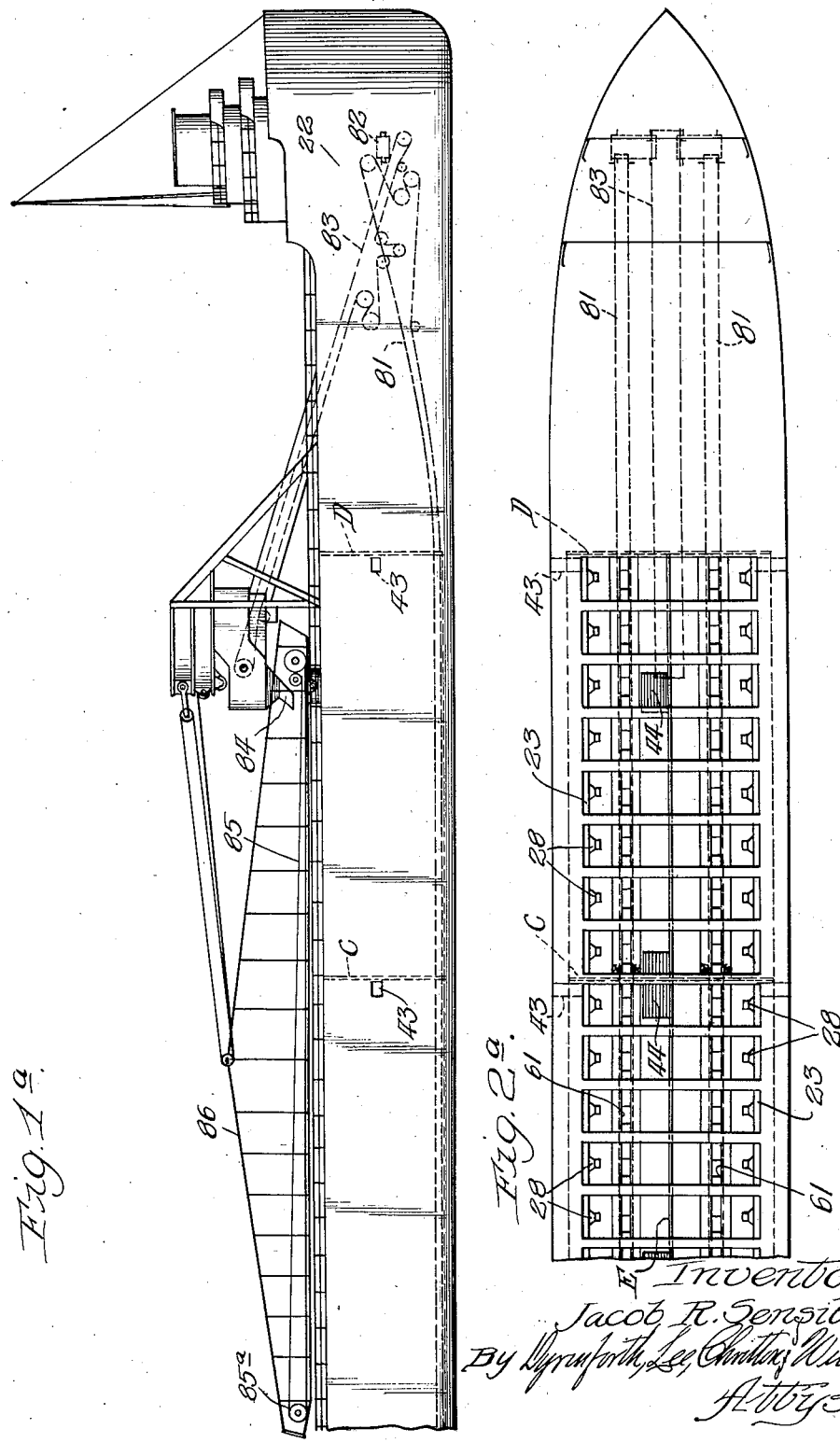

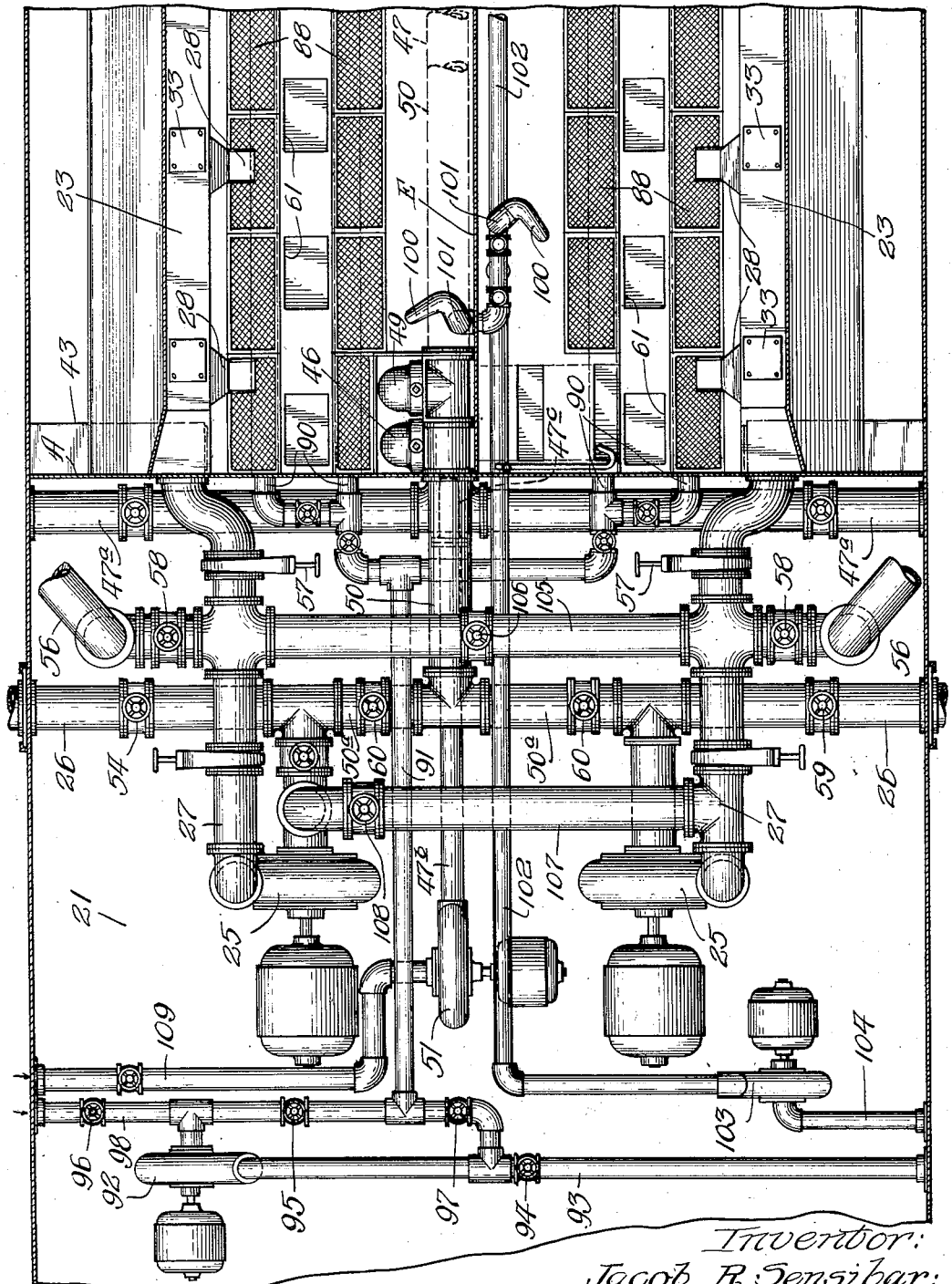

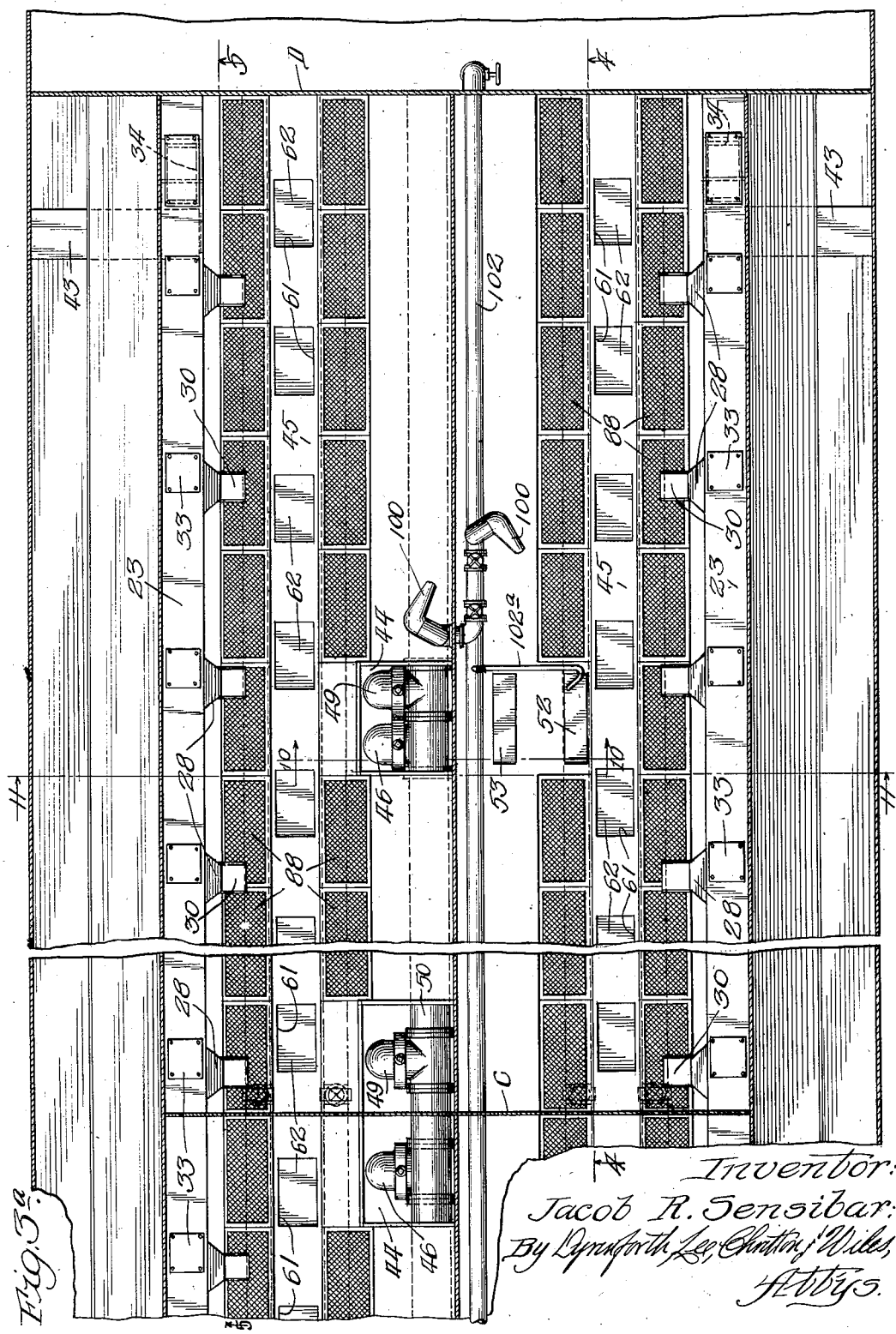

March 24, 1936. J. R. SENSIBAR 2,035,199
MEANS FOR HANDLING SAND
Filed April 1, 1932 11 Sheets-Sheet 5
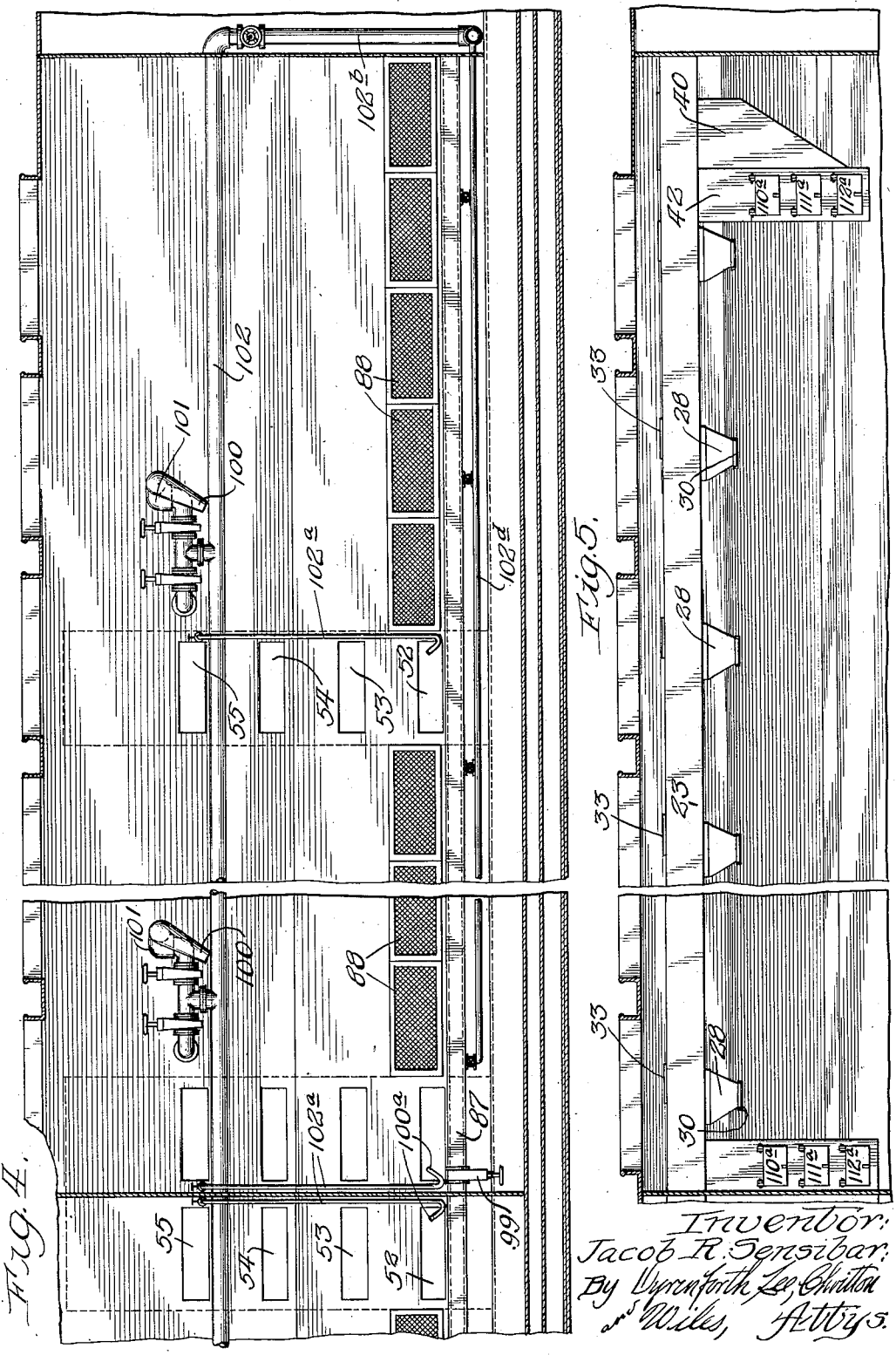

March 24, 1936. J. R. SENSIBAR 2,035,199
MEANS FOR HANDLING SAND
Filed April 1, 1932 11 Sheets-Sheet 6
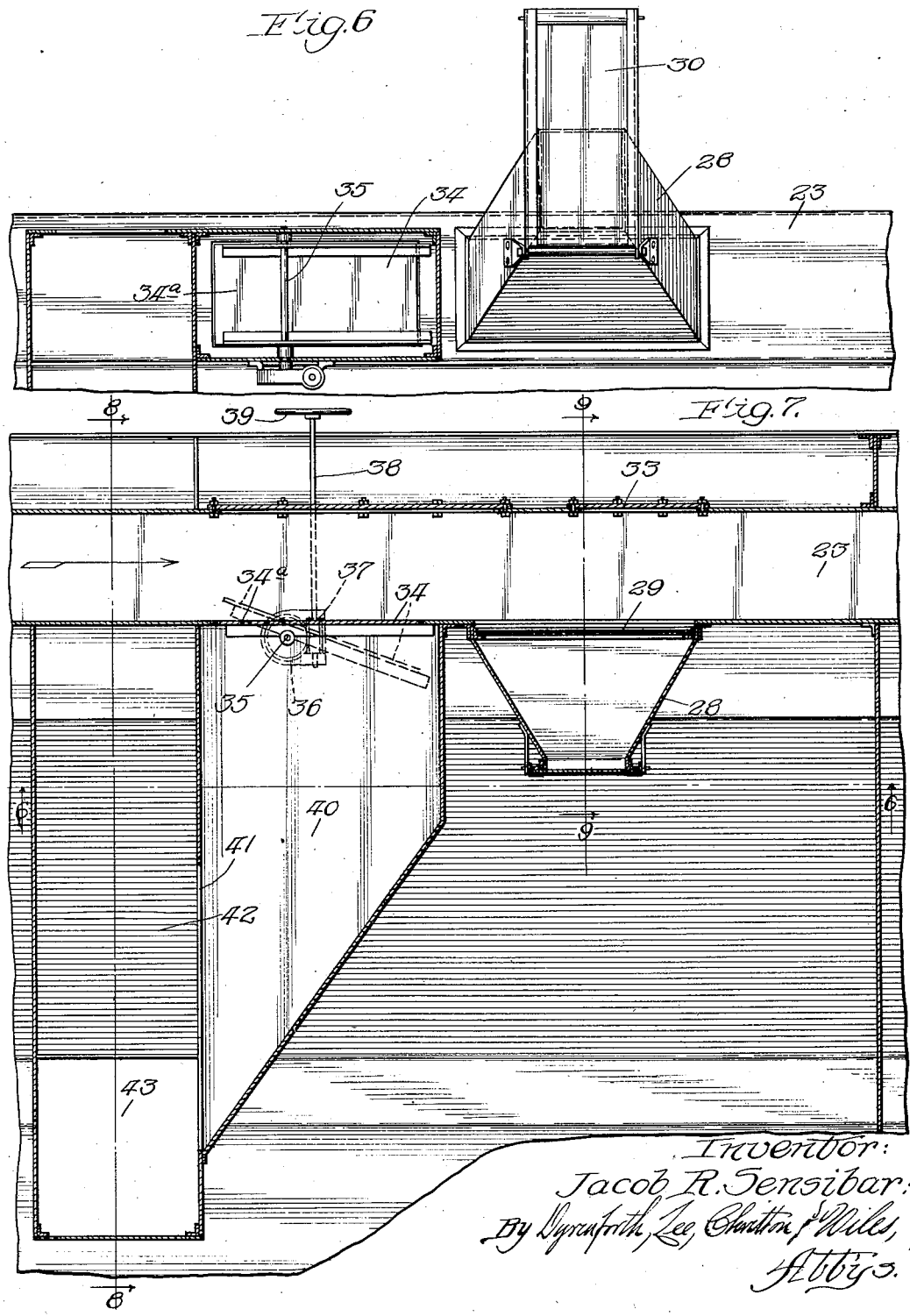

March 24, 1936.  J. R. SENSIBAR  2,035,199
MEANS FOR HANDLING SAND
Filed April 1, 1932   11 Sheets-Sheet 7
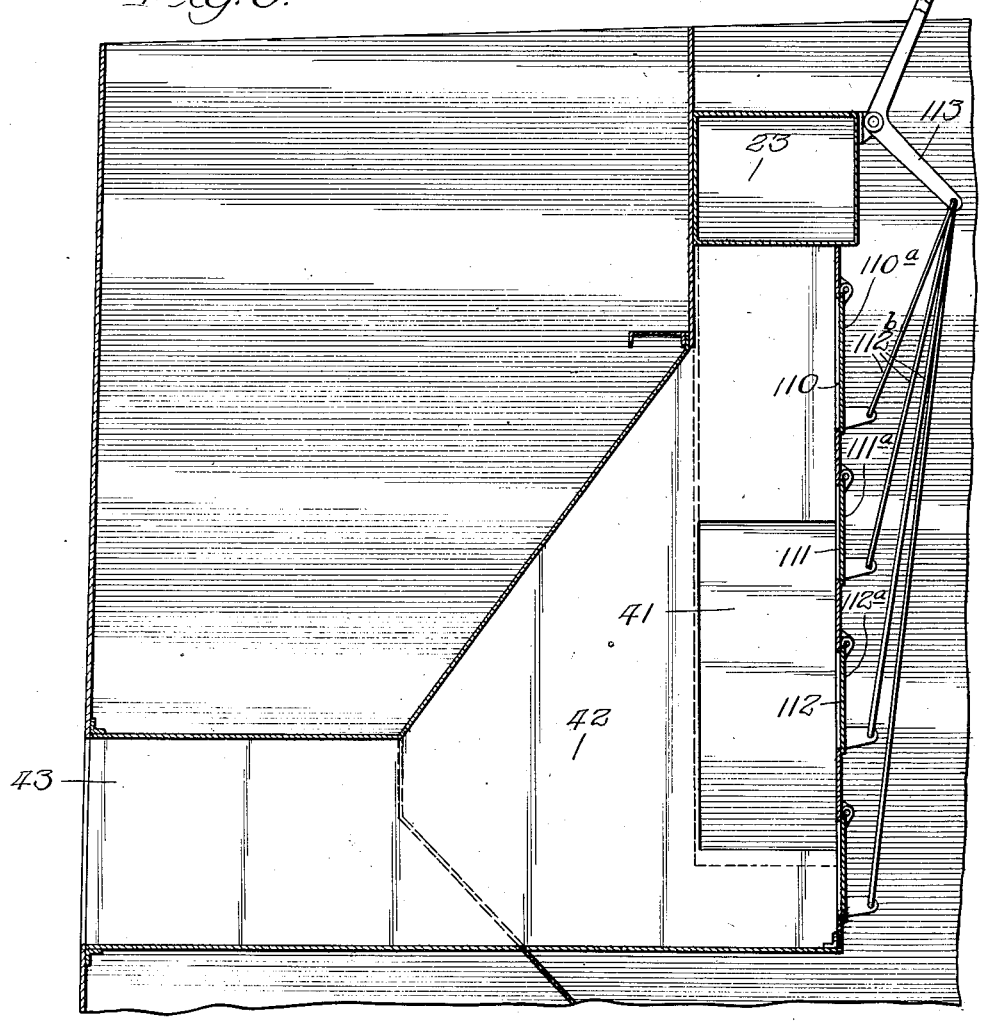
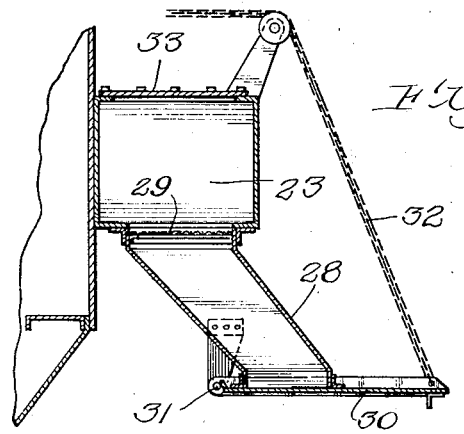
Inventor:
Jacob R. Sensibar

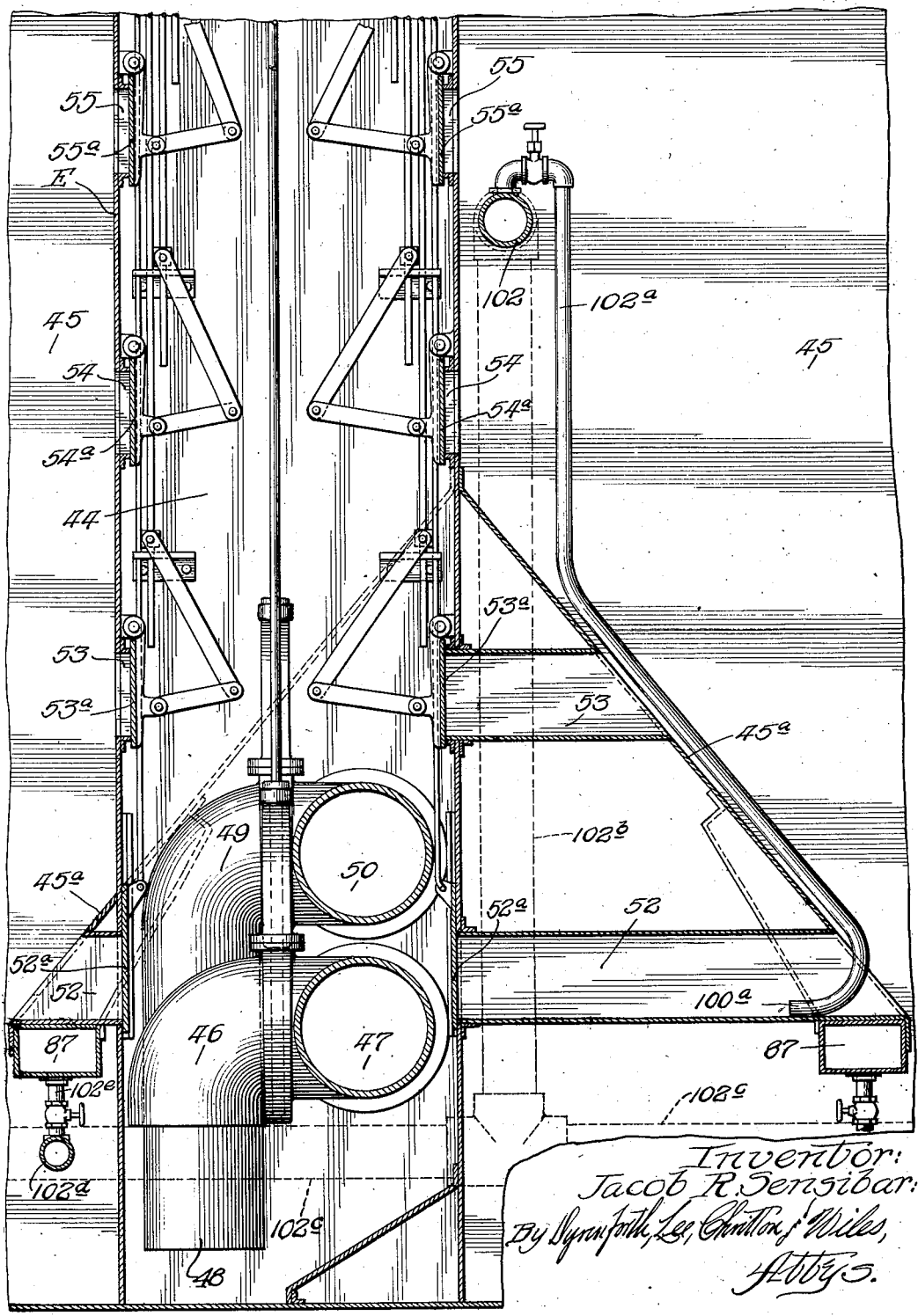

March 24, 1936. J. R. SENSIBAR 2,035,199
MEANS FOR HANDLING SAND
Filed April 1, 1932   11 Sheets-Sheet 9

Inventor:
Jacob R. Sensibar,
By Dynrforth, Lee, Chritton and Wiles,
Attys.

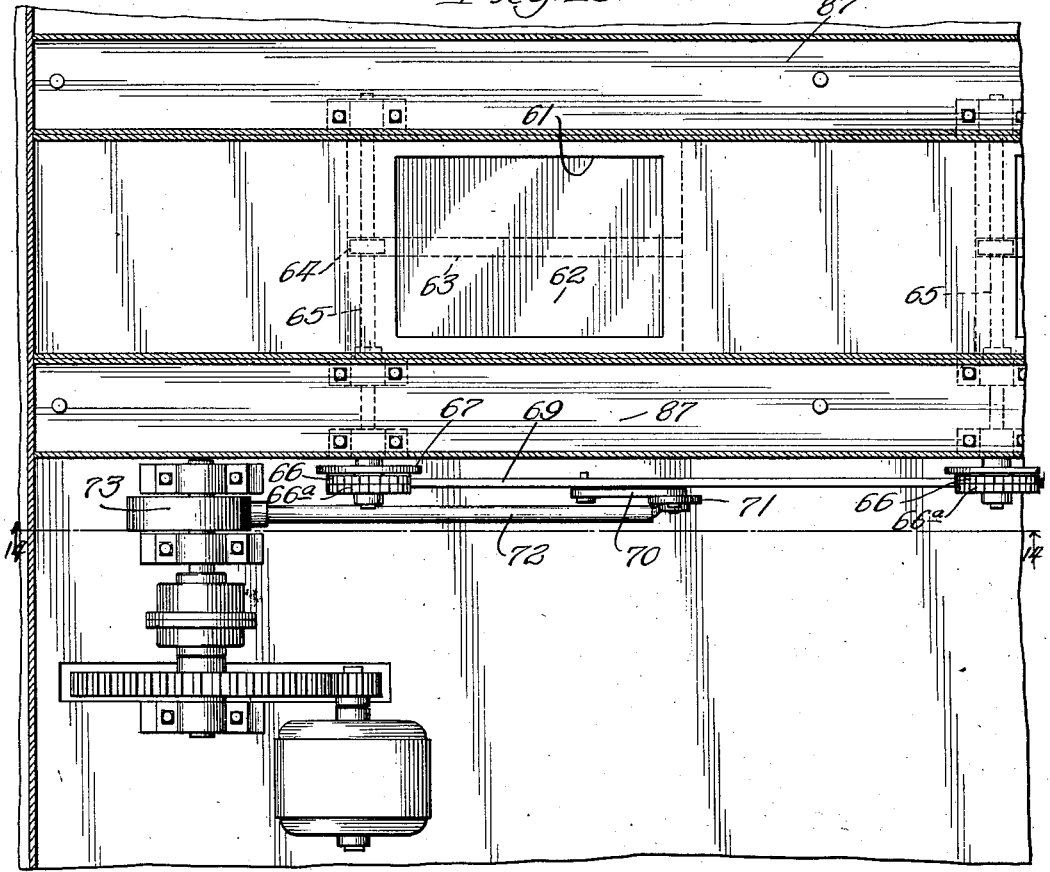
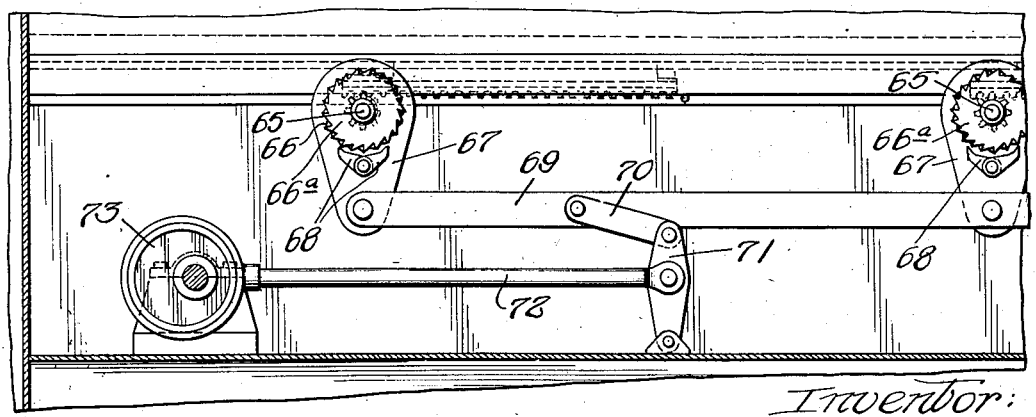

March 24, 1936. J. R. SENSIBAR 2,035,199
MEANS FOR HANDLING SAND
Filed April 1, 1932 11 Sheets-Sheet 11

Inventor:
Jacob R. Sensibar:
By Dynesforth, Lee, Chritton, Wiles, Attys

Patented Mar. 24, 1936

2,035,199

UNITED STATES PATENT OFFICE 2,035,199

MEANS FOR HANDLING SAND

Jacob R. Sensibar, Chicago, Ill.

Application April 1, 1932, Serial No. 602,558

8 Claims. (Cl. 209—44)

This invention relates to improvements in means for handling sand.

Among the features of my invention are improved means for loading the boat, including closed flumes into which sand-laden water is discharged by the suction pumps, and pressure being maintained in said flumes. The flumes are substantially level, with their ends open, and are provided with intermediate discharge openings to prevent undesired precipitation of fine material.

Another feature of my invention is the provision of means for de-watering sand after the same is deposited in the hoppers. Such means includes screened openings at the bottoms of the hoppers communicating with drainage troughs. Means are provided for producing reverse flow of water through these troughs to clean the screens; and such means may be utilized for wetting the sand from the bottom to assist in the wet unloading thereof.

Another feature of my invention is the provision of improved means for wet unloading, including in combination with mixing wells, movable and fixed jets for producing or accelerating movement or flow of sand from the hoppers into said mixing wells. I also provide means for introducing water into said wells, both from the sea by gravity and from auxiliary pumps.

Another feature of my invention is the provision of improved sliding gates at the bottoms of the hoppers for discharging material from the hoppers to the conveyor under the same. I have provided improved mechanism for operating said gates.

Other features and advantages of my invention will appear more fully as I proceed with my specification.

In that form of device embodying the features of my invention shown in the accompanying drawings—

Figure 11:
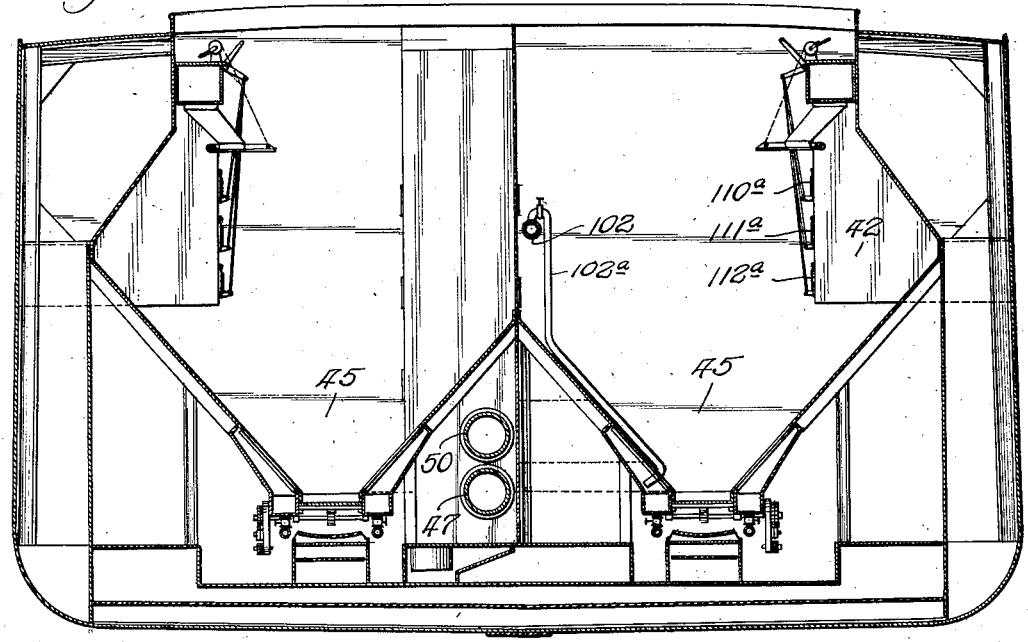
Figure 12:
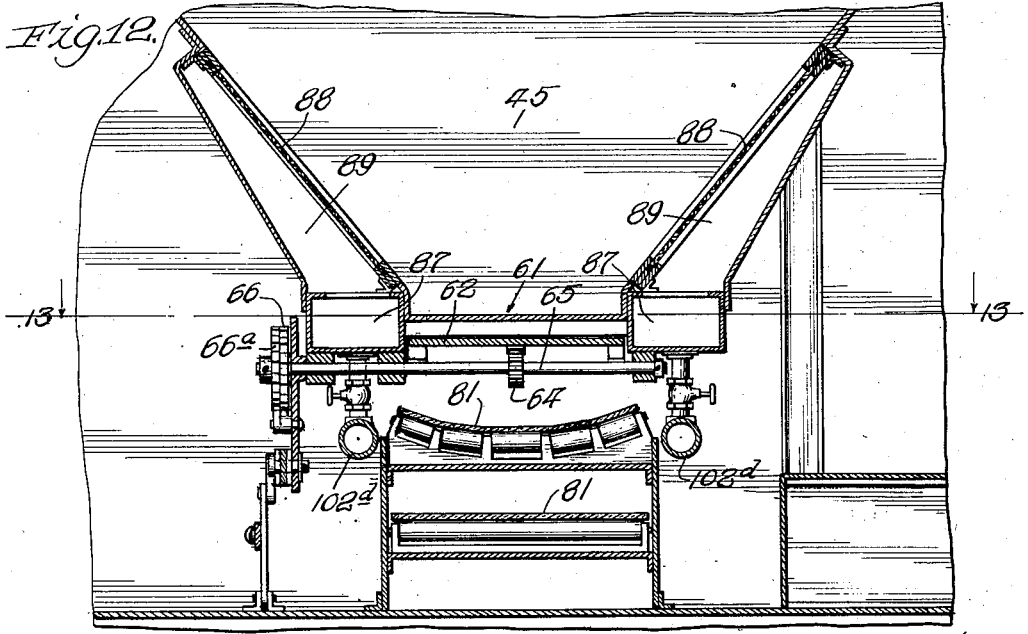
Figure 15:
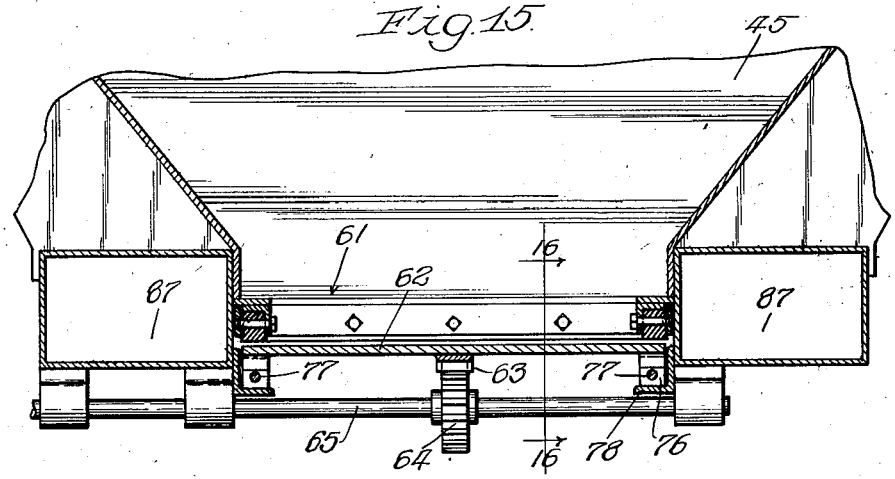
Figure 16:
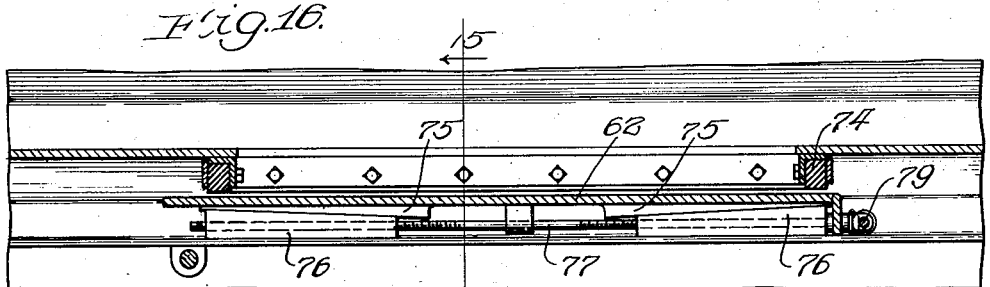
Figure 17:
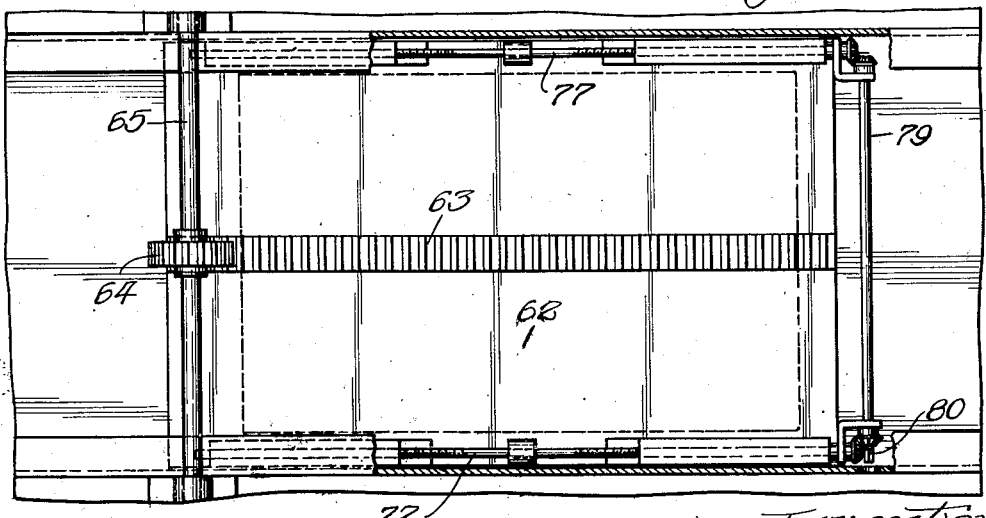

Figures 1 and 1ª together constitute a view in side elevation; Figures 2 and 2ª, a top plan view; Figs. 3 and 3ª, a top plan view an on enlarged scale with portions broken away showing the pumps and piping connections; Fig. 4 is a view taken as indicated by the line 4 of Fig. 3ª; Fig. 5 is a view take as indiated by the line 5 of Fig. 3ª; Fig. 6 is a view of a portion of one of the loading flumes looking upwardly; Fig. 7 is a longitudinal sectional view of one of the flumes looking outwardly; Fig. 8 is a view taken as indicated by the line 8 of Fig. 7; Fig. 9 is a view taken as indicated by the line 9 of Fig. 7; Fig. 10 is a view taken as indicated by the line 10 of Fig. 3ª; Fig. 11 is a view taken as indicated by the line 11 of Fig. 3ª; Fig. 12 is an enlarged fragmentary view similar to Fig. 11; Fig. 13 is a view taken as indicated by the line 13 of Fig. 12; Fig. 14 is a view taken as indicated by the line 14 of Fig. 13; Fig. 15 is a view taken as indicated by the line 15 of Fig. 16; Fig. 16 is a view taken as indicated by the line 16 of Fig. 15; and Fig. 17 is a bottom plan view of one of the sliding gates at the bottom of the hopper.

As shown in the drawings, the boat includes a hull 20 with four transverse partitions or bulk heads A, B, C and D and a central longitudinal partition or bulk head E extending from A to D. Aft of the partition A is a space or compartment 21 in which are housed the pumps, valves, motors, pipe connections and other machinery and apparatus employed in connection with the use and operation of the boat. Forward of the partition D is a compartment 22 which may house the driving mechanism for the conveyors used in dry unloading.

Between the partitions A and D there are thus provided six hoppers (three on each side of the central longitudinal partition E) for the reception and storage of sand and similar material, for example, gravel and the like. Since the construction of each hopper and the mechanism for loading and unloading the same are substantially the same, it will suffice to describe but one.

Wet loading mechanism

I shall first describe the method and apparatus for loading the hoppers. Above the hoppers at each side of the boat is a loading flume 23. It is to be particularly noted that this flume is closed at the top. That is, the flume is entirely closed, except for certain discharge and overflow openings to be referred to hereinafter. In loading the boat, a mixture of water and sand is sucked up through the pipes 24 by the pumps 25, the pipes 26 affording connection between the pipes 24 and said pumps 25. From the pumps 25 the sand-laden water is discharged through the pipes 27 into the flumes 23. See Fig. 3.

Numerals 28 indicate discharge spouts from the flumes 23 into the hoppers. See Fig. 9. Each discharge spout 28 is provided with a removable screen 29 at its upper end and a hinged closure 30 at its lower end, the latter being hinged at 31 and controlled by the cable 32. Above the screen 29 the top of the flume 23 is provided with a removable cover 33 to permit removal, cleaning, repair, exchange or replacement of the screen 29. The character of the material discharged through any of the spouts 28 can be regulated by the particular screen used.

The loading flumes 23 are also provided with valve-controlled discharge openings. See Figs. 6 and 7. Such openings are in the bottom of the flume and controlled by pivoted gates 34. As shown in Figs. 6 and 7, each gate is pivoted at 35 and provided with a gear 36 controlled by a worm 37 on the lower end of the rod 38 which, in turn, can be operated by the hand-wheel 39. As shown in Fig. 7, the direction of flow of the material in flume 23 is indicated by the arrow. It will be seen that by opening the gate 34 to the requisite extent, the desired amount of material may be discharged from the flume 23 downwardly into the chamber 40. From the chamber 40 material so discharged passes through the opening 41 into the chamber 42 which is provided with a discharge opening 43 through the side of the boat, preferably above the water line. As the gate 34 is opened, a portion of the same 34a is moved upwardly into the flume into the path of the stream, thus serving to divert a portion of the stream downwardly through the discharge opening. The discharge openings controlled by the gates 34 operate as classifiers to permit the discharge of the desired size of material through any of the discharge spouts 28. Any material not desired may be discharged through one of the openings controlled by the gates 34 and thus run back overboard. The amount of material permitted to flow through any of the discharge spouts or discharge openings can be controlled by the gates.

In loading the boat the discharge valves 34 at the extreme forward ends of the flumes are preferably adjusted so that the pumps 25 will maintain a certain amount of pressure in the flumes 23. The amount of pressure maintained at different portions in the flume is also regulated by the fineness of the screens 29 employed and the extent of opening of the other valves 34.

*Wet unloading mechanism*

For the purpose of unloading the hoppers with the sand in a more or less wet condition, I provide at the bottom of each hopper one or more mixing wells 44. See Fig. 10. In this figure the hopper itself is indicated by 45. The bottom of the hopper is tapered, as indicated by 45a.

Numeral 46 indicates an elbow attached to a flooding pipe 47 at the bottom of the well and 48 indicates the lower end of an elbow 49 attached to a suction pipe 50. The inlet opening, that is, the lower end of the pipe 48, is somewhat nearer to the bottom of the well than the discharge opening of the elbow 46. Water is adapted to be delivered to the flooding pipe 47 by gravity through the pipes 47a leading to the outside of the boat below the water line. Additional flooding water is adapted to be delivered into the pipe 47 by the pump 51 through the pipe 47b, the discharge end of said pipe being provided with a jet or nozzle 47c directed into the pipe 47. See Fig. 3.

The wells 44 are arranged near the center of the boat adjacent the central partition E so that one well can function in connection with hoppers on both sides of said partition E. See Fig. 10.

Discharge openings from the hoppers into the wells are provided at different heights. As here shown, each hopper is provided with four discharge openings, indicated by 52, 53, 54 and 55, progressing upwardly. The lower openings 52 are controlled by sliding gates 52a and the other openings, by hinged gates 53a, 54a and 55a, respectively.

In unloading the material wet, a requisite amount of water is discharged into the mixing wells by gravity from the pipes 47a supplemented, if necessary, to the desired extent by pressure discharge through the pipe 47b and jet 47c. Material is discharged from the hoppers through the openings 55, 54, 53 and 52. Ordinarily, the upper openings are used first. The discharge of material into the wells and flooding water is regulated to give the desired mixture so that the same may be sucked up through the pipes 48 into the suction pipe 50 which is connected by the pipes 50a to the inlets of the pumps 25, 25. When the pumps are thus sucking, material is discharged through the pipes 27 and into the discharge pipes 56 which may be led to the place where the material is to be deposited. It is to be understood, of course, that when the pumps 25 are to discharge into the pipes 56 and not into the flumes 23, the valves 57 are closed and the valves 58 opened. Likewise, when the pumps 25 are to suck from the pipes 26 instead of the pipe 50, the valves 59 are opened and the valves 60 closed.

*Dry unloading mechanism*

For the purpose of unloading material from the hoppers in a more or less dry condition, there is provided along the bottom of each hopper a series of discharge openings 61 controlled by sliding gates 62. See Figs. 12 to 17. Each gate is provided with a rack bar 63 engaged by a gear 64 on the shaft 65 for sliding the gate. The end of each shaft 65 is provided with two oppositely arranged toothed ratchet wheels 66 and 66a. Numeral 67 indicates a rocking member mounted on the shaft 65 provided with a double dog 68, either end of which can be thrown into engagement with one of the toothed wheels 66 or 66a, one end adapted to engage one of said wheels and the other end, the other of said wheels. The members 67 are adapted to be rocked by the link 69 operated by the connector 70 through the lever 71 which, in turn, can be rocked by the pitman 72 operated by the eccentric 73. When the dogs are in neutral position, rocking of the member 67 will not operate either of the toothed wheels. The shaft 65 may be rotated in either direction, however, by swinging the dog 68 so that one of its ends will engage with the desired toothed wheel 66 or 66a. In this manner, any of the gates may be slid in either direction.

Means are provided for closing the gates tightly when they are in their closed position. Such means includes a thick rubber gasket 74 surrounding the discharge opening 61. The gate 62 is provided on each side with slanting surfaces 75 adapted to be engaged by wedges 76 carried on the double screw shaft 77. Rotation of the shaft 77 draws the wedges 76 together to lift the gate upwardly against the gasket 74. The wedges are supported on angle irons 78 arranged below the gate. The two screw shafts 77 on each side of the gate are adapted to be simultaneously rotated by the cross shaft 79 through the use of bevel gears. See Fig. 17. The end of the shaft 79 is provided with a squared part 80 adapted to be engaged by a suitable wrench for turning the same.

Arranged below the discharge openings 61 is a longitudinal belt conveyor 81 driven by suitable mechanism in the forward part 22 of the boat. Material discharged through the opening 61 falls on the conveyor 81 and is moved forwardly. From this conveyor, material is dumped onto cross conveyors 82, thence onto an inclined conveyor 83 which takes the material rearwardly and above the deck of the boat where it is discharged from the conveyor through a spout 84 into a conveyor 85 carried by an arm or boom 86. This boom is adapted to be swung outwardly to either side over the shore, wharf or other suitable point of discharge. The material is discharged from the end 85ª of the conveyor 85.

Hopper drainage

Means are provided for draining the hoppers of water or de-watering the material therein. This means includes drainage troughs 87 at the sides of the hoppers adjacent the discharge opening 61. Water can drain from the hoppers into these drainage troughs through the screened openings 88 via the compartments 89. Numerals 90 indicate pipes connected to the after-end of the drainage troughs 87, said pipes being connected to the pipes 91 from which water may be sucked from the pump 92 and discharged through the pipe 93 through the side of the boat. By the use of this system, it is possible to so completely remove the water from the sand in the hoppers that it can be unloaded from the vessel dry by means of the belt conveyors hereinbefore described. By thus de-watering the sand, a saving in weight is also accomplished.

Means are provided for causing the reverse flow of water through the drainage troughs 87 and screen 88. This may be necessary or desirable for the purpose of cleaning the screens 88 or for the purpose of introducing water into the hoppers if it is desired to wet the material therein. This reverse flow can be accomplished by closing the valves 94 and 95 and opening the valves 96 and 97. This will cause water to be sucked in from the sea through the pipe 98 and discharged by the pump 92 into the pipe 91 whence it will be fed into the pipes 90 and into the drainage troughs 87.

In order to permit reverse flow of water only in certain portions of the drainage troughs and in order to cut off communication between certain portions of said troughs for other purposes, said troughs are provided with a series of gates or valves throughout their length. There may be any desired number of these valves. To illustrate the invention, I have shown such a valve or gate in each drainage trough adjacent the partitions B and C. One of these valves or gates is indicated by 99 in Fig. 4.

Additional means are provided for draining the hoppers of excess water besides the screens 88. This mechanism is near the top of the hopper and is designed principally to permit discharge therefrom of water accumulating on top of the sand that is deposited in the hoppers. Such mechanism comprising water overflow discharge openings is shown in Figs. 8 and 11. Each hopper is provided with three discharge openings 110, 111 and 112 controlled by gates 110ª, 111ª and 112ª, respectively. These gates are hinged and adapted to be opened by connecting rods 112ᵇ joining the same to the operating levers 113. These gates permit discharge of water into the compartments 42 which, in turn, discharge through the openings 43 through the side of the boat.

Jet system

Means are provided for washing down the material in the hoppers to assist in flowing the same into the discharge openings 52, 53, 54 and 55 leading into the mixing wells. Such apparatus includes one or more movable jets 100 in each hopper. These jets are mounted on universal joints 101 permitting the stream to be directed to substantially any part of the hopper. The streams of water issuing from these jets or nozzles can be directed against material that lodges against the walls of the hopper. By properly directing the streams, material may be washed down from different parts of the hopper and caused to flow through the discharge openings 52, 53, 54 or 55 into the mixing wells.

The jets 100 are supplied with water under pressure from the pipe 102 which is supplied by the pump 103, water being drawn into said pump from the sea through the pipe 104.

Connected to the jet supply pressure pipe 102 are also pipes 102ª leading to fixed jets 100ª in the inner ends of the discharge openings 52 leading from the hoppers to the wells. These fixed jets are employed only in such discharge openings that are relatively long, as shown in Fig. 10, to assist in preventing material from clogging in such openings.

At the forward end of the boat the jet supply pipe 102 is carried downwardly, as indicated by 102ᵇ (see Fig. 10) and provided with lateral branches 102ᶜ to which are connected rearwardly extending pipes 102ᵈ, one under each drainage trough 87. At intervals the pipes 102ᵈ are connected with valve-controlled discharge pipes 102ᵉ leading into such drainage troughs. By these connections, water under pressure may be delivered from the jet system into the drainage troughs 87. This may be necessary, useful or desirable for the purpose of assisting in cleaning such troughs, introducing water into the hoppers through the screens 88 or for cleaning such screens, and the like.

The discharge pipes 27 from the pumps 25 are connected by a pipe 105 controlled by a valve 106 to permit either pump to discharge into either flume 23. The inlet of one pump 25 is connected by the pipe 107 to the outlet of the other pump 85 to permit the pumps to operate in tandem, if desired. Valve 108 controls pipe 107.

Water is supplied to the pump 51 from the suction pipe 109.

In introducing water into the discharge trough 87 from the pipes 102ᵉ, one or more of the valves 99 may be closed in order to direct said water to certain portions of said trough and through certain screens and into certain hoppers.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. In apparatus of the character described; a boat; a hopper; a flume completely closed except for a valve controlled opening therethrough and an outlet therein directed into the hopper; a valve controlling said opening, whereby the pressure in said flume is regulated; a screen over said outlet; and means for discharging a mixture of sand and water into said flume under pressure.

2. In apparatus of the character described; a boat; a hopper; a flume completely closed except for a valve controlled opening therethrough whereby the pressure therein is regulated and an outlet therein directed into the hopper, said flume being provided with a plurality of valve controlled pressure regulating discharge openings leading to the outside of the boat, each valve controlling the same including a pivoted gate with a portion projected into the flume as the valve is opened serving to divert a portion of the stream in the flume through said opening; a screen over said outlet; and means for discharging a mixture of sand and water into said flume under pressure.

3. In apparatus of the character described; a boat; a hopper; a flume completely closed except for a valve controlled opening therethrough and an outlet therein directed into the hopper; a valve in said valve controlled opening whereby the pressure in said flume is regulated; means by which the valve controlled opening delivers to the outside of the boat; a screen over said outlet; and means for discharging a mixture of sand and water into said flume under pressure.

4. In a sand boat of the character described; a plurality of hoppers, each of said hoppers having therethrough dry discharge openings in the bottoms thereof, water drainage openings therethrough adjacent the dry discharge openings, water overflow openings therethrough near the tops, and wet discharge openings therethrough leading to mixing wells; a conveyor under said hoppers adjacent the dry discharge openings; a drainage trough connected to the water drainage openings; mixing wells connected to the wet discharge openings; and selective control means whereby the boat may be unloaded wet or dry.

5. In a boat of the character described; means for loading a mixture of liquid and granular material into said boat, said means including a pump adapted to pump said mixture into the boat; means for drying the material after the same is loaded into the boat; means for unloading said dried material in its dry condition; means for mixing water with said material and unloading the same in a wet condition; and selective means whereby each of said previously described means may be rendered operative.

6. In apparatus of the character described; a boat; a plurality of hoppers having water drainage openings in the bottom thereof; a main drainage trough extending longitudinally of the boat adjacent the hoppers, and connected to said openings, said drainage trough discharging to the outside of the boat; and a gate in said main drainage trough between two of the hoppers.

7. In apparatus of the character described; a boat; a plurality of hoppers having water drainage openings in the bottom thereof; a main drainage trough extending longitudinally of the boat adjacent the hoppers, and connected to said openings, said drainage trough discharging to the outside of the boat; a gate in said main drainage trough between two of the hoppers; and means for introducing water under pressure into the trought at one side of said gate.

8. Apparatus of the character described, including; a boat; means for loading a mixture of liquid and granular material into said boat, said means including a pump adapted to pump said mixture into the boat; means for drying the material after the same is loaded into the boat; a conveyor for unloading said dried material in its dry condition; means for unloading the same in a wet condition, said means comprising a mixing well for mixing water with said material; and selective means whereby each of said previously described means may be rendered operative.

JACOB R. SENSIBAR.